United States Patent Office 3,135,763
Patented June 2, 1964

3,135,763
PROCESS FOR PREPARATION OF 3-AMINO-2-ARYL-PYRAZOLES
Jean Druey, Riehen, and Paul Schmidt, Therwil, Switzerland, assignors to Ciba Corporation, a corporation of Delaware
No Drawing. Filed Dec. 13, 1957, Ser. No. 702,549
Claims priority, application Switzerland May 7, 1956
6 Claims. (Cl. 260—310)

This invention relates to the new 3-(p-aminobenzene sulfonamido)-2-phenyl-pyrazole of the formula

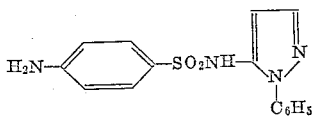

and its salts, for example those of the alkali and alkaline earth metals, especially of sodium, and methods of preparing same.

This new compound exhibits a surprisingly good effect in the case of experimental infection of animals, for example in the case of mice infected with streptococci. It can be used with advantage as a medicament in infectious diseases, e.g. in streptococcal infections. Compared with similar known aminobenzene sulfonamides, the new compound has surprisingly better chemotherapeutic properties. Thus, in the case of streptococcal infection in the house, good results are obtained with the new compound at a blood concentration which is only half of that of the known 3-(aminobenzene sulfonamido)-2-phenyl-5-methyl-pyrazole. In addition, the new compound has a better antibacterial effect in the intestine than the above-mentioned 5-methyl compound and is also superior to the latter as regards its urine-disinfecting effect.

The new aminobenzene sulfonamidopyrazole can be produced by reacting a compound of the formula

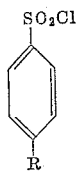

with a compound of the formula

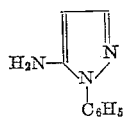

or its dihydro derivative, wherein R indicates the amino group or a substituent convertible thereinto by hydrolysis and converting by hydrolysis into the amino group in the resulting compound any substituent R so convertible and oxidizing any dihydropyrazole compound obtained at any stage of the process to the pyrazole compound. The reaction is advantageously carried out in the presence of an acid binding condensing agent, such as a strong organic or inorganic base, for example a tertiary amine especially pyridine. A substituent convertible by hydrolysis into the amino group is, preferably a lower acylamino group, for example the acetylamino or carbethoxyamino group. The hydrolysis is effected in the usual way. Oxidation, if necessary, is carried out in the customary manner, e.g. by using an oxidizing agent, such as iron-(III) salts, hydrogen peroxide and the like. If the reaction, however, runs over an intermediate product which is to be converted into the end-product by hydrolysis, oxidation occurs during the ordinary hydrolysis without any oxidizing agents being added.

Therapeutically useful salts of the new aminobenzene sulfonamides with bases can be prepared in the customary manner, for example by reaction with bases such as alkali metal, e.g., sodium or potassium, hydroxides or alkaline earth metal e.g. calcium, hydroxides or organic bases. The salts of the new compound are distinguished by a low pH value. Thus the sodium salt of the new sulfonamide in 1% aqueous solution has the very low pH value of 8.

The new sulfonamide and its salts can be used as medicaments, for example in the form of pharmaceutical preparations which contain the active substance in admixture with an organic or inorganic, solid, or liquid carrier material suitable for enteral, parenteral or topical administration. As carrier material there come into consideration those substances which do not react with the new compound, such as for example water, gelatine, lactose, starches, colloidal silicic acid, magnesium stearate, talc, vegetable oils, benzyl alcohols, gums, polyalkylene glycols, white petroleum jelly, cholesterol or other known carriers. The pharmaceutical preparations can be for example in the form of tablets, dragees, salves, creams or in liquid form as solutions, suspensions or emulsions. They may also be sterilized and/or contain auxiliary substances, such as preserving agents stabilizing, agents, wetting agents or emulsifying agents, salts to alter the osmotic pressure or buffers. They may also contain other therapeutically valuable substances. The preparations are made in the ordinary way. They contain the new sulfonamide or its salts in an amount of over 0.1 gram per dosage unit, preferably between 0.25 and 3 grams.

The invention also comprises the new intermediate, particularly the 3-amino-2-aryl-pyrazoles and their acid addition salts, and specifically the 3-amino-2-phenyl-pyrazole and its acid addition salts. Another object of the invention is a new method for preparing 3-amino-2-aryl-pyrazoles which consists in intramolecularly condensing N-aryl-N'-(β-cyano-ethyl)-hydrazines in the presence of oxidizing agents. The reaction is preferably carried out by treating the starting materials in the presence of acids with the oxidizing agents and, if desired after isolation of an intermediate formed, with alkaline agents so as to bring about ring closure. As acids there are preferably used strong inorganic acids, such as hydrochloric or sulfuric acid. Useful oxidizing agents are, for example, organic peracids, but the preferred agents are hydrogen peroxide or ferric salts, such as ferric sulfate or chloride, or hydrogen peroxide in the presence of such salts.

The N-aryl-N'-(β-cyano-ethyl)-hydrazines may have substituents in the aryl nucleus and/or the ethylene radical provided that the ethylene radical has in either of the α-and β-position a hydrogen atom.

The 3-amino-2-aryl-pyrazoles form salts with acids, such as hydrohalic, sulfuric, phosphoric, acetic, citric, oxalic or hydroxy ethane sulfonic acid.

This application is a continuation-in-part of our co-pending application Serial No. 656,503 filed May 2, 1957, now Patent No. 2,858,309.

The following examples illustrate the invention:

*Example 1*

Into a solution of 15.9 grams of 3-amino-2-phenyl-pyrazole in 60 cc. of anhydrous pyridine, 29 grams of p-carbethoxyamino-benzene sulfonyl chloride are introduced within about 25 minutes. When the reaction subsided, heating is carried out for a further hour to 90–95° C. internal temperature. The reaction solution is then poured into 300 cc. of 2 N-hydrochloric acid, filtered with suction from the precipitate and recrystallized from dilute alcohol. The 3-(p-carbethoxyaminobenzene sulfonamido)-2-phenyl-pyrazole is obtained thus in white crystals of M.P. 175–176° C.

These are taken up in 250 cc. of 2 N-caustic soda solution and heated for 1 hour on a boiling water bath. With hydrochloric acid, the pH is then adjusted to 6–7 and the precipitate is filtered with suction and crystallized from 75% ethyl alcohol. The resulting 3-(p-aminobenzene sulfonamido)-2-phenyl-pyrazole crystallises in white crystals and has a melting point of 177–178° C. It can be converted into its sodium salt by dissolving it in the calculated amount of dilute sodium hydroxide.

The new 3-amino-2-phenyl-pyrazole used as starting material can be prepared in the following manner:

A solution of 2 grams of 3-amino-2-phenyl-4-carbethoxy-pyrazole (obtainable according to the process described in our copending application Serial No. 637,895 filed February 4, 1957, now abandoned) in 20 cc. of 75% sulfuric acid is heated for 6 hours in a bath at 150° C. The reaction solution is then poured onto ice, brought to pH=8 with concentrated caustic soda solution, extracted with chloroform and the chloroform residue distilled. 3-amino-2-phenyl-pyrazole passes over at a pressure of 0.15 mm. and a temperature of 142–144° C. and solidifies to crystals in the receiver; M.P. 42–44° C.

A surprising and very valuable process for the preparation of the new starting material consists in that N-($\beta$-cyanoethyl)-N'-phenyl hydrazine is intramolecularly condensed in the presence of an oxidizing agent, such as an iron-III-salt, e.g. ferric sulfate, hydrogen peroxide or the like, to yield 3-amino-2-phenyl-pyrazole. This can be accomplished for example as follows:

In the course of an hour, 160 grams of ferric sulfate are introduced with stirring into a solution of 64 grams of N-($\beta$-cyanoethyl)-N'-phenyl hydrazine in 700 cc. of 2 N-sulfuric acid. Stirring is continued at room temperature for 20 minutes. The pH of the reaction solution is then adjusted to 10 with 10 N-caustic soda solution, the solution is extracted with ether, the ethereal solution evaporated, and the residue distilled. 3-amino-2-phenyl-pyrazole passes over at 123–130° C. at a pressure of 0.02 mm. and solidifies in the receiver. The product forms yellowish crystals which, after recrystallization from toluene, melt at 50–51° C. A further example for this method is as follows:

34 grams of hydrogen peroxide in the form of an aqueous solution of 30 percent strength by volume are added dropwise to a mixture of 161.2 grams of N-phenyl-N'-($\beta$-cyano-ethyl)-hydrazine, 0.65 gram of ferric sulfate and 5 grams of concentrated sulfuric acid in 325 grams of water. The addition is made at 15–20° C. while the mixture is being stirred and cooled with ice. The oily phase is exhaustively extracted with chloroform. The chloroform extract is dried with sodium sulfate in the presence of a trace of ferrous sulfate, then filtered and evaporated, towards the end under reduced pressure at a bath temperature of 90–100° C. The resulting intermediate product is distilled at 86–87° C. under a pressure of 0.07 to 0.08 mm. of mercury. 159.2 grams of the undistilled crude product are stirred in a solution of 4.4 grams of sodium hydroxide in 500 grams of water for one hour at 90–95° C. The mixture is cooled and extracted exhaustively with chloroform, the chloroform extract dried with sodium sulfate and evaporated, towards the end under reduced pressure at a bath temperature of 90–100° C. For purification, the crude 3-amino-2-phenyl-pyrazole is fractionated at 138–140° C. under a pressure of 0.1 mm. of mercury over a trace of zinc powder. It is then obtained in the form of a pale yellow oil which crystallizes on standing. After being recrystallized from toluene the 3-amino-2-phenyl-pyrazole melts at 50–51° C.

This method can also be used for the preparation of other 3-amino-2-aryl-pyrazoles in which the aryl and/or the ethylene radical is unsubstituted or substituted. The new compound forms salts with inorganic or organic acids, such as hydrohalic acids, sulfuric acid, methane sulfonic acid, nitric acid, phosphoric acid, oxalic acid, tartaric acid, citric acid, hydroxyethane sulfonic acid, toluene sulfonic acid and the like.

*Example 2*

To a solution of 6.44 grams of 3-amino-2-phenyl-dihydropyrazole in 50 cc. of pyridine there are added in the course of 10 minutes 23.8 grams of para-acetylaminobenzene sulfonic acid chloride. The temperature rises to about 65° C. After the exothermic reaction has subsided, the mixture is heated for one hour at 95° C. (internal temperature) and then poured on to 500 cc. of 2 N-hydrochloric acid and a little ice. The precipitate containing bis-(p-acetyl-amino-benzene sulfonyl) - 3 - amino-2-phenyl-dihydropyrazol is suction-filtered.

The crude product so obtained is mixed directly with 360 cc. of 2.5 N-caustic soda solution, and the resulting suspension is boiled for 2 hours, mixed with animal charcoal and filtered. The pH of the filtrate is then adjusted to 5–6 with 5 N-hydrochloric acid, whereupon a crystalline precipitate is formed, which is suction-filtered and recrystallized from alcohol. 3-(p - amino-benzene-sulfonamido)-2-phenyl-pyrazole is obtained. This product is identical with the compound obtained in Example 1; it has the same melting point, ultraviolet spectrum and infrared spectrum.

The 3-amino-2-phenyl-dihydro-pyrazole used as starting material is prepared as follows:

To 16.1 grams of N-($\beta$-cyanoethyl)-N'-phenyl-hydrazine (prepared by condensing phenyl-hydrazine with acrylonitrile) there are added 200 cc. of 8 N-alcoholic hydrochloric acid. A white precipitate is formed immediately. The reaction mass is then stirred for one hour at room temperature and heated for two hours at the boil. After cooling, the hygroscopic precipitate formed is suction-filtered. The hydrochloride so obtained is dissolved in 70 cc. of water, and the solution is rendered strongly alkaline with ice-cooling, whereupon a white precipitate is formed and suction-filtered. The 3 - amino - 2 - phenyl-dihydro-pyrazole so obtained melts after recrystallization from isopropyl ether at 106–107° C. It is new; it forms salts with inorganic or organic acids, such as hydrohalic acids, nitric acid, sulfuric acid, phosphoric acids, methane sulfonic acid and the like.

*Example 3*

To a solution of 159 grams of 3-amino-2-phenyl-pyrazole in 600 cc. of anhydrous pyridine there are added in the course of about 30 minutes 267 grams of p-acetylaminobenzene sulfonic acid chloride of 96% strength. After the reaction has subsided, the mixture is heated for one hour at 90–95° C. internal temperature. The reaction solution is then poured on to 3 liters of 2 N-hydrochloric acid, the sulfonamide precipitating as a greasy mass. After decanting the water, the grease consisting of a mixture of 3-(p-acetylaminobenzene sulfonamido)-2-phenyl-pyrazole and bis-(p-acetylaminobenzene sulfonyl)-3-amino-2-phenyl-pyrazole is taken up in 3 liters of 2.5 N-caustic soda solution and boiled under reflux for 2½ hours. The solution is clarified with animal charcoal and the pH of the filtrate is adjusted to 6 with 6 N-hydrochloric acid, whereupon a precipitate is formed which soon solidifies in crystalline form. The product is recrystallized from 1200 cc. of alcohol with the addition of animal charcoal. 3-(p-aminobenzene-sulfonamido)-2-phenyl-pyrazole is obtained in the form of white crystals and is identical with the product obtained in Example 1 according to the mixed melting point and its ultraviolet spectrum.

The above mentioned 3-(p-acetylaminobenzene sulfonamido)-2-phenyl-pyrazole can be obtained in pure form by crystallization from ethanol; it then melts at 190–191° C.

*Example 4*

3-(p-aminobenzene sulfonamido)-2-phenyl-pyrazole is worked up to a slightly plastic mass with wheat starch and a paste from colloidal silicic acid with hydrolysed starch and granulated. After drying at 50° C., the granules are worked up to the usual size, and arrowroot, magnesium stearate and talc as external layer are added to the material to be pressed, and tabletting is carried out. By using appropriate starting materials tablets with the following composition can be prepared:

| | Mg. |
|---|---|
| 3 - (p - aminobenzene sulfonamido) - 2 - phenyl-pyrazole | 500.0 |
| Colloidal silicic acid with hydrolysed starch | 30.0 |
| Wheat starch | 30.0 |
| Arrowroot | 40.0 |
| Magnesium stearate | 5.0 |
| Talc | 20.0 |
| | 625.0 |

What is claimed is:

1. Process for the preparation of 3-amino-2-arylpyrazoles comprising intramolecularly condensing in the presence of a dehydrating oxidant selected from the group consisting of (1) hydrogen peroxide, (2) an organic peracid, (3) a ferric salt and (4) a mixture of hydrogen peroxide and a ferric salt an N-($\beta$-cyanoethyl)N'-aryl-hydrazine the ethylene radical of which contains at least one hydrogen in each of the $\alpha$- and $\beta$-positions and the aryl radical of which is devoid of reactive substituents.

2. Process for the preparation of 3-amino-2-aryl-pyrazoles comprising intromolecularly condensing in the presence of hydrogen peroxide an N-($\beta$-cyanoethyl)-N'-aryl-hydrozine the ethylene radical of which contains at least one hydrogen in each of the $\alpha$- and $\beta$-positions and the aryl radical of which is devoid of reactive substituents.

3. Process for the preparation of 3-amino-2-phenyl-pyrazole comprising intramolecularly condensing N-($\beta$-cyanoethyl)-N'-phenyl-hydrazine in the presence of a dehydrating oxidant selected from the group consisting of (1) hydrogen peroxide, (2) an organic peracid, (3) a ferric salt and (4) a mixture of hydrogen peroxide and a ferric salt.

4. Process for the preparation of 3-amino-2-phenyl-pyrazole comprising intramolecularly condensing N-($\beta$-cyanoethyl)-N'-phenyl-hydrazine in the presence of hydrogen peroxide as oxidizing agent.

5. Process for the preparation of 3-amino-2-phenyl-pyrazole comprising intramolecularly condensing N-($\beta$-cyanoethyl)-N'-phenyl-hydrazine in the presence of hydrogen peroxide and a catalytic amount of ferric sulfate as oxidizing agent.

6. Process for the preparation of 3-amino-2-phenyl-pyrazole which comprises reacting N-($\beta$-cyanoethyl)-N'-phenyl-hydrazine in an acid solution with hydrogen peroxide in the presence of a catalytic amount of ferric sulfate, isolating the intermediate product formed, and subjecting it to the action of an alkaline agent so as to produce 3-amino-2-phenyl-pyrazole.

FOREIGN PATENTS

| 872,801 | France | Feb. 23, 1942 |
| 989,223 | France | May 23, 1951 |
| 679,678 | Great Britain | Sept. 24, 1952 |

OTHER REFERENCES

Cusmano: Chem. Abstracts, vol. 34, col. 7903 (1940).

Westoo et al.: Chem. Abstracts, vol. 50, col. 301 (1956).